March 5, 1940.　　　　R. H. ROSENBERG　　　　2,192,696
BRAKE SHOE CONSTRUCTION
Filed Nov. 26, 1938　　　2 Sheets-Sheet 1
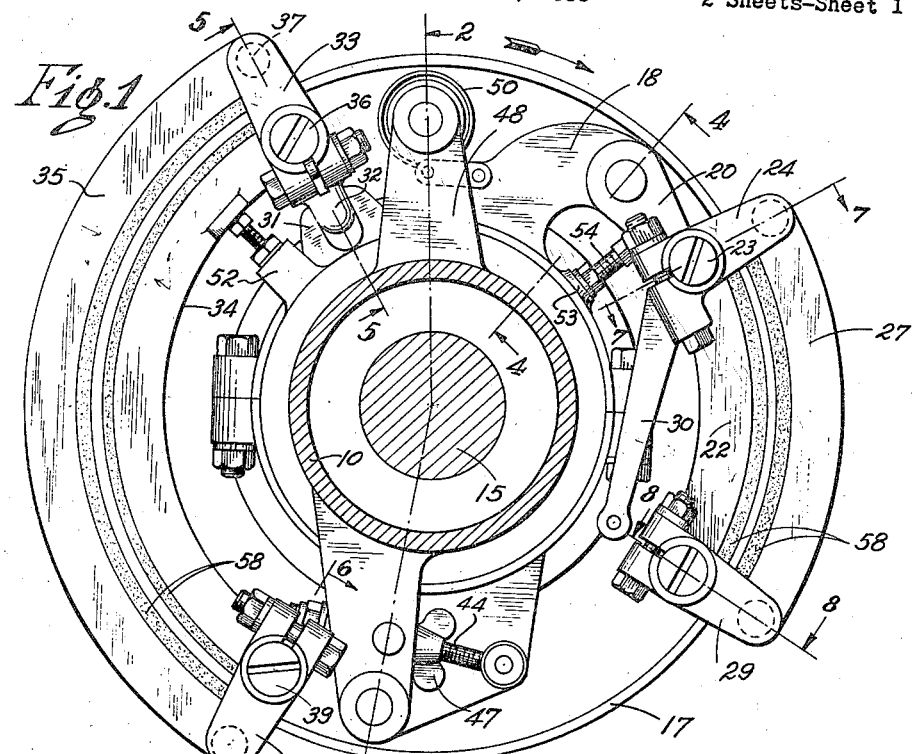
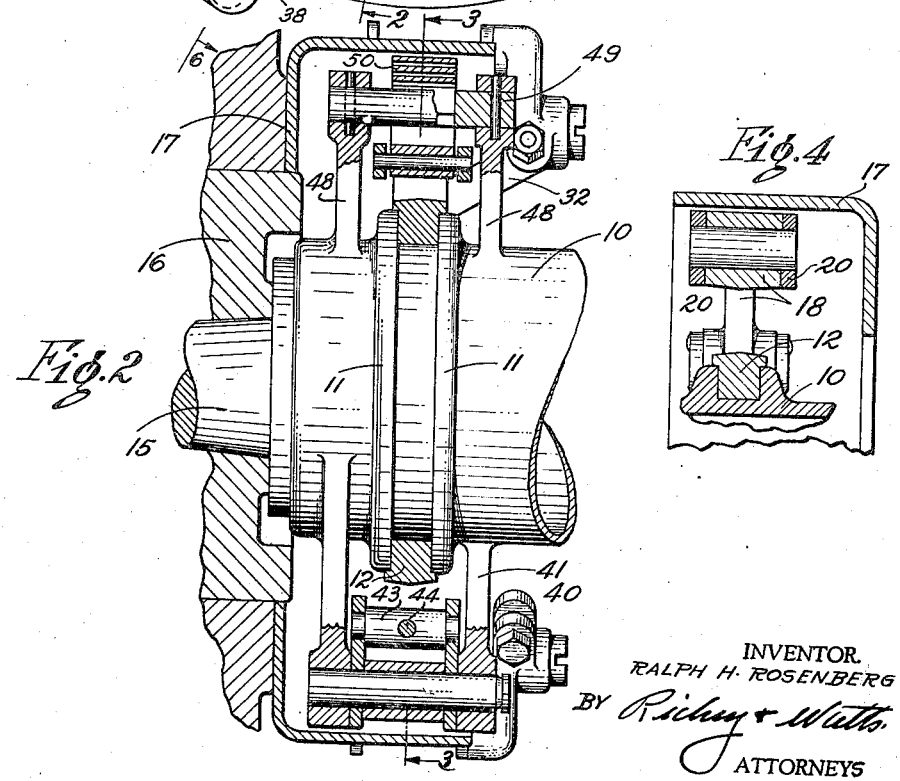
INVENTOR.
RALPH H. ROSENBERG
BY Richey & Watts
ATTORNEYS March 5, 1940.                    R. H. ROSENBERG                    2,192,696
                              BRAKE SHOE CONSTRUCTION
                                Filed Nov. 26, 1938                 2 Sheets-Sheet 2
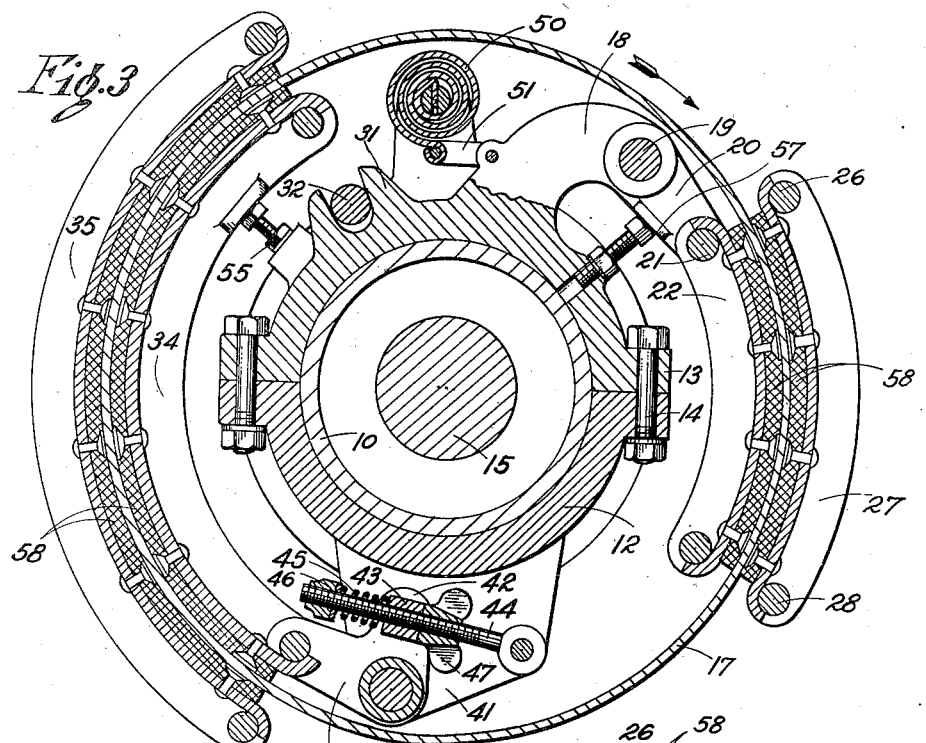
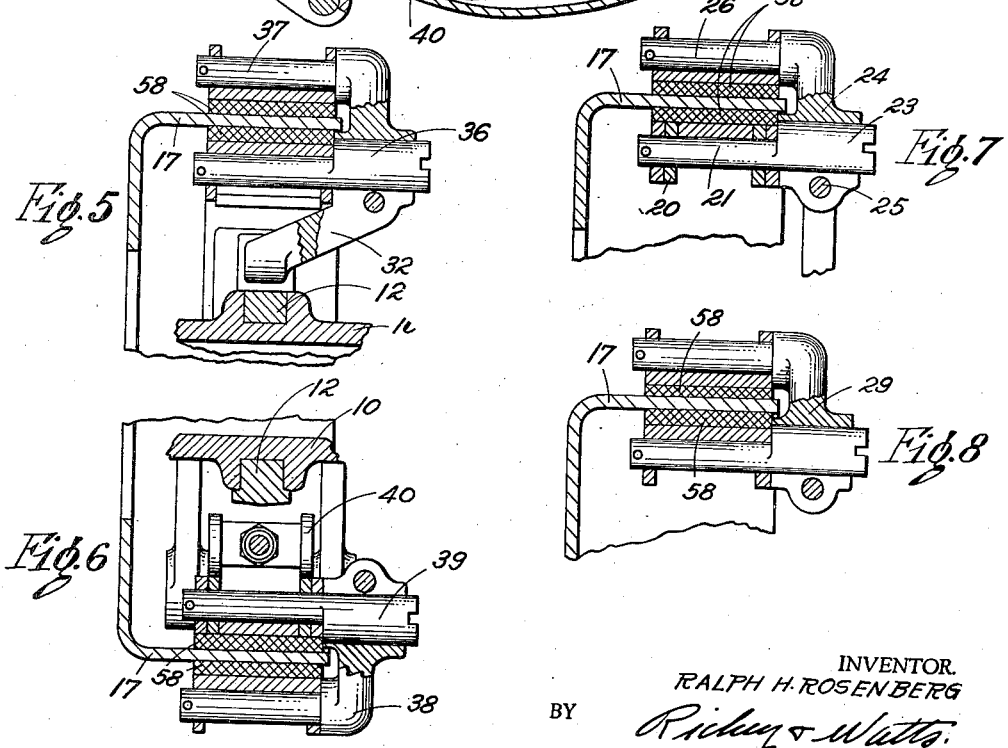
INVENTOR.
RALPH H. ROSENBERG
BY
Rickey & Watts
ATTORNEYS Patented Mar. 5, 1940

2,192,696

UNITED STATES PATENT OFFICE 2,192,696

BRAKE SHOE CONSTRUCTION

Ralph H. Rosenberg, Detroit, Mich., assignor to Detroit Duo-Grip Brake Company, Detroit, Mich., a corporation of Michigan Application November 26, 1938, Serial No. 242,538

7 Claims. (Cl. 188—76)

This invention relates broadly to brake mechanisms for motor vehicles and more specifically to improvements in brakes of the self energizing type.

One of the objects of the invention is to provide a brake shoe operating mechanism which is adapted to effectuate simultaneous operation of the internal and external brake shoes and equalize the load imposed upon the brake drum during the operation of the brake.

Another object of the invention is to provide a self energizing brake which is organized to obviate the seizure or locked engagement of the brake shoes with the drum.

Another object of the invention is to construct a brake mechanism which is economic of manufacture, sturdy of structure and susceptible to ready adjustment in compensation of wear of the brake lining.

Other objects and advantages more or less ancillary to the foregoing and the manner in which all the various objects are realized will appear in the following description which, considered in connection with the accompanying drawings, sets forth the preferred embodiment of the invention.

Referring to the drawings, wherein the preferred embodiment of the invention is illustrated:

Figure 1 is a transverse sectional view through the rear axle of a motor vehicle showing a side elevational view of the brake shoes and operating mechanism therefor.

Figure 2 is a vertical section through the brake mechanism illustrated in Figure 1, the section being taken on the plane indicated by the line 2—2 in Figure 1.

Figure 3 is a transverse section through the brake illustrated in Figure 1, the section being shown on the plane indicated on the line 3—3 in Figure 2.

Figure 4 is a detailed sectional view illustrating the construction of one of the brake shoe anchors, the section being taken on the plane indicated by the line 4—4 in Figure 1.

Figure 5 is a detailed sectional view through the brake shoe anchor mechanism, the section being taken on the plane indicated by the line 5—5 in Figure 1.

Figure 6 is a detailed sectional view illustrating the outer support for the brake shoes, the section being taken on the plane indicated by the line 6—6 in Figure 1.

Figure 7 is a detailed sectional view illustrating the support of the energizing brake shoe members, the section being taken on the plane indicated by the line 7—7 in Figure 1.

Figure 8 is a similar detailed sectional view through the energizing brake shoe members, the section being taken on a plane indicated by the line 8—8 in Figure 1.

Referring to the drawings, the vehicle rear axle housing 10 is formed with a pair of annular flanges 11 machined to receive a split ring 12 having ears 13 thereon for the reception of the clamping bolts 14.

The axle shaft 15 extends through the housing 10 and is keyed to the vehicle wheels 16 which support the brake drum 17 in the manner customarily employed in automotive construction.

The ring 12 is formed with an arm 18 drilled at its outer end for the support of a pin 19 constituting the pivotal support for a pair of links 20 which carry a pin 21 forming the support for the internal brake shoe energizing member 22. The pin 21 is constructed with an eccentric head portion 23 mounted in the brake shoe supporting yoke 24, the inner end of which is split and cross drilled to receive a bolt 25 for clamping the eccentric portion of the pin 21 in adjusted position. The outer end of the yoke member 24 is provided with a pintle 26 which may be formed integral with the body of the yoke member as shown or as a separate pin pressed and pinned in the enlarged outer end of the yoke member. The external brake shoe energizing member 27 is mounted upon the pintle 26 and a similar pintle 28 formed in the yoke member 29 which supports the free ends of the energizing brake shoes 22 and 27. The yoke member 25 is formed with an actuating lever 30 adapted to receive the yoked end of a pull rod (not shown) which is connected with the brake operating mechanism in the manner customarily employed in automotive brake construction.

The ring 12 is formed with a radially extended boss 31 notched to receive a lug 32 formed in a yoke member 33 which supports the internal brake shoe 34 and external brake shoe 35 through the pin 36 in the pintle 37 respectively. The opposed ends of the brake shoes 34 and 35 are supported by a yoke member 38 of similar construction to the yoke member 29, the internal brake shoe supporting pin 39 thereof having mounted thereon a pair of bell cranks 40 fulcrumed upon a bracket 41 formed in the axle housing 10. The inner legs 42 of the bell cranks are drilled for the pivotal support of a tie bar 43 which is cross bored to receive a threaded eyebolt 44 pivotally connected to the bracket 41.

Upon the outer end of the eye-bolt 44 there is a compression spring 45 retained by a nut 46 and adjacent the inner end of the tie bar 43 there is a wing nut 47 to facilitate the angular adjustment of the bell cranks 40. The axle housing 10 is constructed with a pair of radially extended arms 49 drilled at their free ends to receive a pin 49 which is slotted to retain an end of a helical spring 50, the opposed end of which is connected to the arm 18 through a pivotally mounted link 51. The axle housing is also formed with bosses 52 and 53 for the support of jack screws 54 and 55 adapted for engagement with bearing pads 56 and 57 formed respectively upon the internal brake shoes 34 and link 20 to limit the inward radial adjustment thereof.

The construction of the eccentric head portions of the yoke pins is provided so that the clearance between the internal brake shoes and brake drum may be altered to compensate for the wear of the brake lining 58 of the brake shoes and brake energizing members.

In operation when the arm 30 is pulled forward (to the right of the position illustrated in Figure 1) the yoke member 24 will fulcrum upon the pin 21 and the link 20, thus causing the yoke member to oscillate and foreshorten the radial distance relative to the brake drum between the pins 21 and 26. The oscillatory or twisted movement of the yoke draws the external brake energizing member 27 inwardly and upwardly against the brake drum and at the same time draws the internal brake shoe outwardly and downwardly against the drum. Such action causes the brake energizing shoe members 22 and 27 to seize the brake drum and exert a torsional effort upon the ring 12, since the anchorage of the yoke 27 faces the direction of rotation of the brake drum. As the shoes 22 and 27 grip the brake drum the ring 12 will be rotated and thus swing the arm 32 and cause the oscillatory or twisted movement of the yoke member 33. The movement of the yoke causes the inward and downward movement of the external brake shoe 35 and the upward and outward movement of the internal brake shoe 34, and the consequent oscillation of the yoke member 38 which effectuates the simultaneous actuation of both ends of the inner and outer brake shoes and uniform bearing of the brake lining upon the inner and outer periphery of the brake drum 17. Since the bell cranks 40 to which the yoke 38 it attached are supported upon the ring 12 and are rotated therewith, it will be seen that the yoke 38 is free to oscillate without restriction. The oscillation of the yoke member 38 causes the outer end of the bell cranks 40 to rock radially outward and thereby compress the spring 45 during the period in which the brake is applied. When the brake is released the spring 45 will cause the return of the bell cranks to their normal adjusted position as defined by the adjustment of the jack screw 55. Likewise, upon release of the brake operating mechanism, the helical spring 50 will effectuate the return of the ring 12 to its normal position of adjustment as defined by the adjustment of the jack screw 54.

It is to be understood that other forms or types of springs may be employed in substitution for the spring 50 and that such constructions are contemplated as falling within the scope of the present disclosure.

It will be recognized that since the anchor point of the brake shoes 34 and 35 will rock in the direction of rotation of the brake drum the brake shoes will merely drag thereon when the ring is rotated by the energizing shoes 22 and 27. Moreover, since the area of the shoes 34 and 35 is apparently greater than the area of the shoes 22 and 27 the torsional restriction applied to the ring 12 will prevent the shoes 22 and 27 from seizing the brake drum in locked engagement.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A brake mechanism comprising a brake drum, an internal and external brake shoe engageable therewith, yokes uniting the ends of said brake shoes, a ring pivotally connected to the internal brake shoe, a second pair of internal and external brake shoes engageable with said brake drum and having a greater brake energizing area than the first named brake shoes, yokes uniting the ends of the second named brake shoes, an arm on one of the last named yokes engages with said ring, and an arm on one of the first named yokes for oscillating said yoke about the pivotal connection between the internal brake shoe and said ring.

2. A brake mechanism comprising a brake drum, a brake energizing mechanism, and an internal and external brake shoe energized thereby, said brake energizing mechanism comprising an internal and external brake shoe, yokes uniting the ends thereof, linkage connected to one side of the yoke which is disposed in leading relation to the direction of rotation of the brake drum, yokes uniting the ends of said energized brake shoes, one side of the last named yoke which is disposed in trailing relation to the direction of rotation of the drum being connected to said linkage.

3. A brake mechanism comprising a flanged brake drum, an internal and external brake shoe therefor, a pair of yokes spanning the flange of said brake drum and uniting said brake shoes, a ring mounted for concentric movement in relation to the brake drum, an arm thereon interlinked with the internal brake shoe, a second pair of internal and external brake shoes diametrically opposite the first named brake shoes, a pair of yokes spanning the brake drum and uniting said brake shoes, an arm on one of said yokes engaged with said ring and a spring for urging said ring to its preadjusted position.

4. A brake mechanism comprising a brake drum, an internal and external brake shoe therefor, yokes uniting the ends of said shoes, a ring interlinked with one of said yokes, a second pair of internal and external brake shoes, yokes uniting the ends thereof, one of said yokes being interlinked with said ring, stops to delimit the inward movement of the internal brake shoes and a spring normally urging the internal brake shoe into engagement with said stops.

5. A brake mechanism comprising a brake drum, an internal and external brake shoe therefor, yokes uniting the ends of said shoes, a ring interlinked with one of said yokes, a second pair of internal and external brake shoes, yokes uniting the ends thereof, one of said yokes being interlinked with said ring, stops to delimit the inward movement of the internal brake shoes and a spring normally urging the last named brake shoe into engagement with one of said stops and a second spring for effecting the return of the ring to its preadjusted position.

6. A brake mechanism comprising a brake drum, an internal and external brake shoe therefor, yokes uniting the ends of said shoes, a ring interlinked with one of said yokes, a second pair of internal and external brake shoes, yokes uniting the ends thereof, one of said yokes being interlinked with said ring, stops to delimit the inward movement of the internal brake shoes, a bell crank pivotally mounted on said ring and having one end thereof connected to one of said yokes, and a spring mounted on the outer arm of said bell crank for urging the last named internal brake shoe into engagement with the stop coordinated therewith.

7. In combination with an automobile rear axle having a pair of spaced flanges thereon, a brake mechanism, comprising a brake drum, a pair of brake energizing shoes disposed respectively about the inner and outer periphery of said drum, yokes uniting the ends of said brake energizing shoes, a ring mounted for rotative movement between the flanges of said axle, the branch of the yoke supporting the inner brake energizing shoe being pivotally connected to said ring, a pair of brake shoes, yokes uniting the ends thereof, the branch of the yoke supporting the inner brake shoe being pivotally connected to said ring, the inner brake energizing shoe being connected to the ring at the leading end of rotation of the brake drum and the inner brake shoe being connected to the ring at the trailing end of rotation of the brake drum.

RALPH H. ROSENBERG.